G. W. JACKSON.
MOTOR TRUCK WITH UNLOADING MEANS.
APPLICATION FILED AUG. 23, 1913.
1,119,353.
Patented Dec. 1, 1914.
2 SHEETS—SHEET 1.
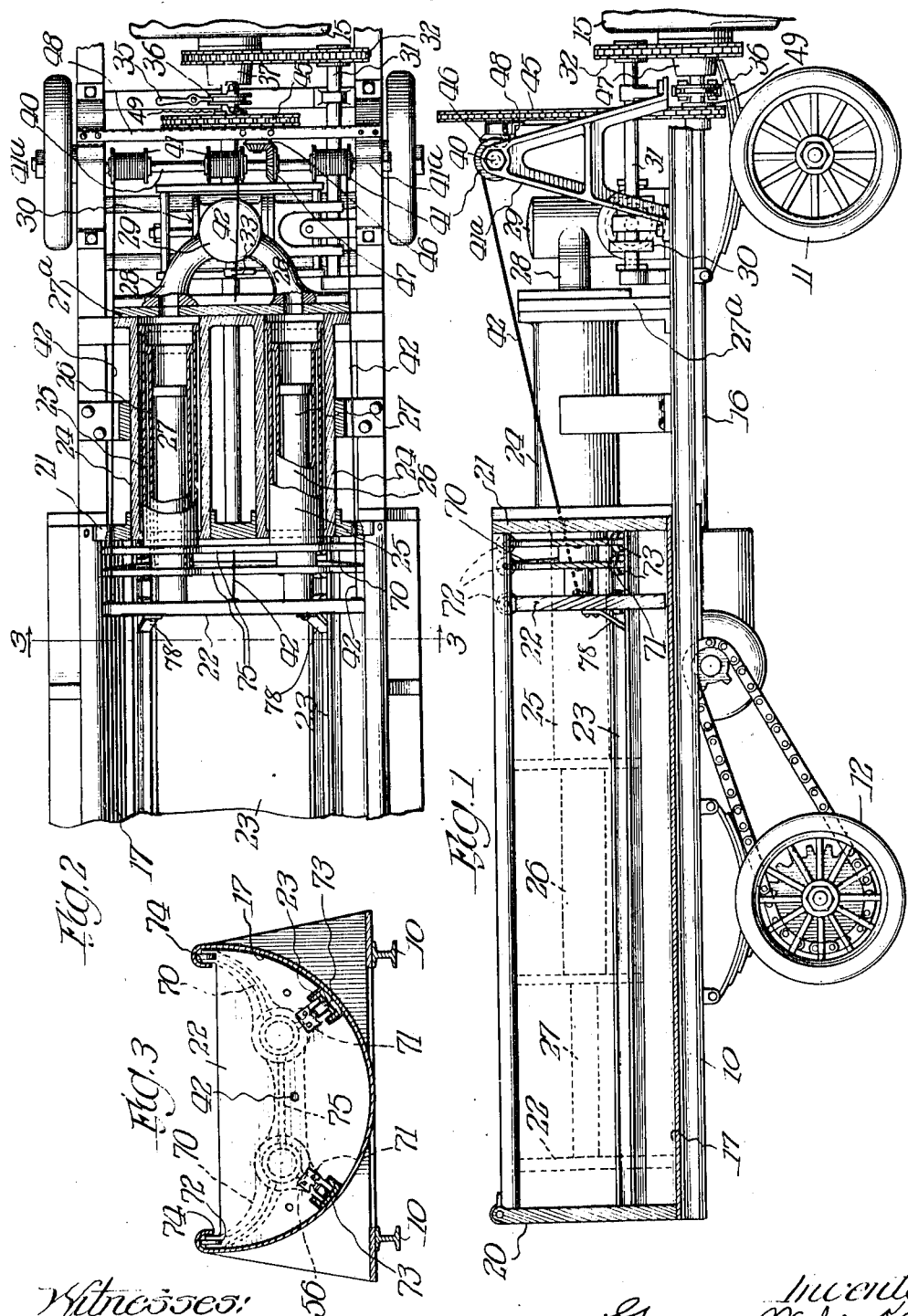

G. W. JACKSON.
MOTOR TRUCK WITH UNLOADING MEANS.
APPLICATION FILED AUG. 23, 1913.
1,119,353.
Patented Dec. 1, 1914.
2 SHEETS—SHEET 2.
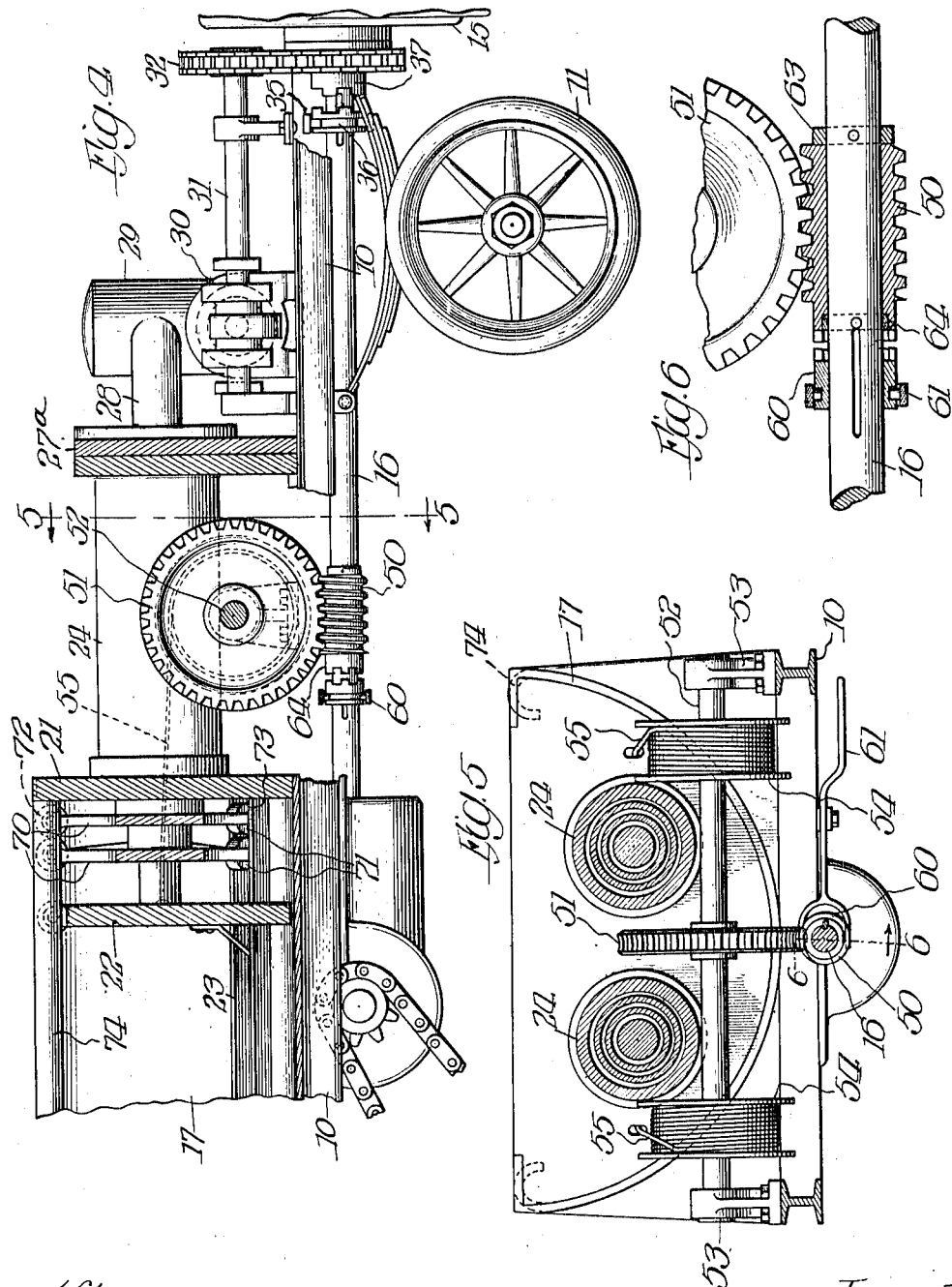

UNITED STATES PATENT OFFICE.

GEORGE W. JACKSON, OF CHICAGO, ILLINOIS.

MOTOR-TRUCK WITH UNLOADING MEANS.

1,119,353.  Specification of Letters Patent.  Patented Dec. 1, 1914.

Application filed August 23, 1913. Serial No. 786,240.

*To all whom it may concern:*

Be it known that I, GEORGE W. JACKSON, a citizen of the United States, and a resident of Chicago, in the county of Cook and State of Illinois, have invented certain new and useful Improvements in Motor-Trucks with Unloading Means; and I do hereby declare that the following is a full, clear, and exact description thereof, reference being had to the accompanying drawings, and to the characters of reference marked thereon, which form a part of this specification.

This invention relates to improvements in motor driven trucks for transporting material in bulk and refers more specifically to a type of truck wherein the load is discharged from the body by forcing the load rearwardly to and through the rear end of the body instead of tilting the body to dump the load, as has been a common practice. A truck of this general character is shown in prior application for U. S. Letters Patent, Serial No. 751,241 filed on the 28th day of February, 1913.

Among the objects of the invention is to provide means for returning the slidable piston or analogous part, such as is shown in said application, after the latter has been thrust rearwardly to force the load out of the rear end of the body.

A further object of the invention is to provide means for affording a reliable guiding connection between the movable telescopic and expansible cylinder and piston elements and the body so as to hold the parts in place.

The invention consists in the features of construction, the combination of elements and arrangement of the parts hereinafter set forth, one exemplification of which is illustrated in the accompanying drawings, and the invention is more particularly pointed out in the appended claims.

In the drawings:—Figure 1 is a side elevation of a truck embodying my invention, with parts broken away, showing in dotted lines the unloading devices in their extended positions. Fig. 2 is a plan view of the forward part of the truck with certain parts of the unloading mechanism shown in section. Fig. 3 is a transverse section on the line 3—3 of Fig. 2. Fig. 4 is a fragmentary side elevation of a truck, with parts broken away, showing a modification of the mechanism for returning the slidable end wall or piston. Fig. 5 is a section on the line 5—5 of Fig. 4. Fig. 6 is a section on the line 6—6 of Fig. 5.

The supporting frame or chassis of the truck includes side bars 10 supported on the front and rear wheels 11 and 12, respectively. The truck is driven by any suitable self contained power plant as, for instance, an internal combustion engine 15 which is connected by transmission mechanism 16 and chain and sprocket mechanism to the axle of the rear driving wheels.

The load carrying body 17 of the truck is preferably located principally above the rear driving wheels, and is also preferably made with the side and bottom walls thereof curved or of semi-cylindrical contour, so as to thereby avoid sharp angles and corners therein.

The rear end gate 20 may be manually movable or removable, or it may be hinged at its upper edge to swing rearwardly at its lower edge. 21 designates the front wall of the body, and in rear of which is mounted a movable wall or piston element 22 which constitutes, in effect the front wall of the body, and which is peripherally shaped to conform to the trough-like shape of the body. The said movable wall or piston is adapted to slide or reciprocate within the trough-like body and is guided and held against rotary or tilting movement by means of channel bars 23 arranged longitudinally of the body at the inner side thereof, the end wall being notched to engage over said guide bars.

The end wall or piston is forced rearwardly to force the load out of the body through the medium of one or a plurality of sets of telescopic or expansible cylinder and piston elements 24, 25, 26, 27, the outer one of which, constituting a fixed cylinder, is fixedly supported between the forward fixed wall 21 of the truck body and an upstanding plate or abutment 27ᵃ rigidly mounted and suitably braced on the truck frame. As shown, two sets of expansible cylinder and piston elements are employed with their longitudinal axes arranged at the sides of the center of the movable end wall or piston so as to thereby force the wall or piston rearwardly without tendency to effect a binding strain of the wall against the side walls of the body. The innermost piston element 27 of each set is fixed at its rear end to the movable wall or piston 22, as shown in Figs. 1 and 2, the wall 21 being perforated for the passages of the cylinder and piston elements 25, 26 and 27. The said pistons are extended in a direction parallel to the longitudinal axis of the truck body, either by hydraulic or pneumatic energy, which may be supplied thereto through the pipes 28 suitably connected thereto and to the receiver 29 of a pump 30, supported on the front end of the chassis. The said pump is operated by a driving shaft 31 which is connected to the main shaft of the motor as by the chain and sprocket mechanism 32.

A controlling valve 33 may be provided to regulate the admission of the fluid to the hollow, telescopic cylinder and piston elements for expanding or extending the latter, and a clutch operating lever 35 serves to connect the shaft 31 to and disconnect it from the main driving shaft of the motor; said lever 35 acting on a clutch spool 36 that is splined to the main motor shaft and is toothed to engage the hub 37 of one of the sprocket wheels of the chain and sprocket mechanism 32, as most clearly clearly shown in Fig. 2.

When it is desired to discharge a load from the truck body, the rear end gate or wall 20 may be removed or, if said end gate be hinged as indicated in Fig. 1, its locking means are released, so that when the load is moved rearwardly by the sliding piston, said load is free to be discharged from the rear end of the truck body. The said movable piston or front end wall of the body is forced rearwardly by connecting the pump to the main driving shaft, as by throwing in the clutch actuating lever 35. The motive fluid, either a liquid when hydraulically operated, or air when pneumatically operated, is by the pump forced through the pipes 28 into the telescopic cylinders and pistons so as to expand or elongate them and thereby force the piston 22 through the body and push the load rearwardly. The rate of movement imparted to the movable end wall or piston by the expansive cylinders and pistons may be controlled either by the speed of the motor or by the valve 33. After the slidable end wall or piston has been forced rearwardly to discharge the entire contents of the body, it is positively moved forwardly to its normal position in which it closes the front end of the body. One mechanism for effecting this result is made as follows:

40 designates a shaft that is arranged transversely over the front end of the chassis, and as shown, in front of the pump. It is rotatively mounted in bearings supported on suitably shaped standards 41ª, 41ª which rise from the side bars of the chassis. The said shaft is provided with one or more drums 41 about which are wound a cable or cables 42, the latter fixed at the rear end or ends thereof to the slidable piston or front end wall of the body. Preferably, a plurality of such cables and drums are employed, three being herein shown, one attached to each side of the discharging or movable piston or wall and the third near the central portion thereof. The said shaft 40 is operably connected to the motor to rotate the shaft 40 through the medium of chain and sprocket mechanism 45 geared to the main driving shaft and through intermeshing gears 46, 47, the former rotatively mounted in a bearing carried by a cross bar 48 extending between and supported in the standards 41ª, and the latter fixed to the transverse shaft 40. The said transverse shaft is adapted to be connected to and disconnected from the motor shaft by the clutch lever 35, said lever acting on the spool 36 to move it toward and from the hub 49 of one of the sprocket wheels of the chain and sprocket mechanism 45. The said shaft 40 is disconnected from the main driving shaft when the pump is operating to force the slidable piston or end wall rearwardly to discharge the load, and when the load has been discharged, the pump is disconnected from the motor by means of the clutch lever 35, and said clutch lever is operated to connect the motor to the transmission shaft 40 so that the motor thereby operates to return the movable piston to the front end of the body, at which point it serves as the front wall of the body to retain the load. The clutch spool 36 occupies a central or neutral position when the truck is on the road.

Other means may be employed for returning the movable end or piston to its normal position at the front end of the body. For instance, as shown in Figs. 4, 5 and 6, the driving shaft 16 of the motor is provided with a worm 50 which meshes with a worm gear 51 that is fixed to shaft 52 which extends transversely across and between the frame and the expansible pistons, as herein shown. Said shaft is rotatively mounted in bearings or brackets 53, 53 which are fixed to the chassis in any suitable manner. The said shaft is provided near its ends with drums 54, 54 about which are trained cables 55, 55 that are connected to the movable end wall or piston 22, adjacent to the sides thereof. It is convenient to arrange the worm gear 51 partially between the two sets of expansible pistons, and with the shaft 52 just below the level of the center of said movable end wall or piston. This construction possesses the advantage that a more direct pull is exerted on the movable end wall or piston 22 when returning the same to normal position and, for this reason, is in some instances, preferable. In order to disconnect the motor from the said movable end wall or piston after the latter has been returned to its normal position, I may mount the worm 50 on the motor shaft 16 so as to be normally loose thereon, and provide any suitable form of clutch 60 to lock the worm to said shaft, adapted to be operated by a clutch lever 61. As shown, the clutch member 60 is splined to the shaft to slide thereon, but to rotate therewith. Thus, when the truck is on the road the worm and worm gear remain stationary, but the worm turns with said shaft when the clutch is engaged with the worm. The worm is held from endwise movement between collars 63, 64 on the shaft 16.

In order to hold the extensible cylinder and piston elements 25 and 26 in line when the same are extended, supporting arms 70, 71 are carried by and extend outwardly from said piston elements and carry at their outer ends rollers 72, 73, respectively, which engage longitudinal guide grooves 74 at the upper edges of the body walls and other guides at the inner sides of said walls below their upper edges. The upper edge guides 74 may be formed by turning the upper marginal portions of the body wall inwardly in channel form, as shown in Fig. 3, while the lower inner guides may be formed by the channel bars 23, before referred to. The said supporting arms are attached in any suitable manner to the extended ends of the cylinder and piston elements, as shown in Figs. 1 and 2, and, if desired, like cylinder and piston elements of the two sets may be connected by transverse braces or struts 75, as shown in Figs. 2 and 3. If desired, the upper edge of the end wall or piston may be provided with rollers 72 to engage the guide grooves 74. In order to clear the channeled guides 23 of material in advance of the rollers 73 any form of suitable scraper device 78 may be carried by the end wall 22 or by the arms 71 to traverse said guides during the movement of the end wall or piston. When the slidable end wall or piston is returned and the cylinder and piston elements 24, 25, 26 and 27 are thereby collapsed, the motive fluid may be discharged from the piston elements and the pump by any suitably applied valve on the pump or its receiver.

It will, of course, be understood that the shaft 16 may be disconnected from the rear driving wheel chain and sprocket mechanism, by any suitable means, not shown, when the load is being ejected from the body and when the piston 22 is being returned to its forwardmost position, so as to not thereby drive the vehicle during the unloading and restoring movements of the piston.

It will, of course, be understood that a driver's seat, as well as the steering and controlling mechanism may be installed where desired or necessary, but these features of construction have been omitted to avoid confusion in illustrating the essential features of the invention.

Other exemplifications of my invention will occur to those skilled in the art, and the invention is not limited, therefore, except as made the subject of specific claims. For instance, I may employ one or a plurality of the return cables 42, 55, or one or a plurality of sets of cylinder and piston elements when this mechanism constitutes the means of thrusting the end wall or piston backwardly. So far as the present invention is concerned, other means may be employed to force said unloading piston element backwardly.

I claim as my invention:—

1. A self-dumping motor truck comprising, in combination with a wheeled chassis, a trough-like body arranged longitudinally above and supported on said chassis and provided with a fixed front wall and a movable rear end gate, of a load discharging member slidable through the body toward and from said end gate, and means to actuate said load discharging member comprising a series of telescopic cylinder and piston elements, a fixed abutment on the chassis between which and said front body wall the outer fixed cylinder element of said series is held, the inner piston element of said series being fixed to said discharging member, and positively actuated means to return the load discharge member to the front end of said body.

2. A self dumping motor truck comprising, in combination with a wheeled chassis, a motor thereon and a power shaft operatively connected to said motor and to the driving wheels of said chassis to operate the latter, of a trough-like body arranged longitudinally above and supported on said chassis and provided with a fixed front wall and a movable rear end gate, a load discharging member slidable through the body toward and from said end gate, and means to actuate said discharge member comprising a series of telescopic cylinder and piston elements, a fixed abutment on the chassis between which and said front body wall the outer fixed cylinder element of said series is held, the inner piston element of said series being fixed to said load discharge member, a pump operatively connected to said motor to supply a motive fluid to said series of cylinder and piston elements, and means operatively connected to said motor for restoring said load discharge element to the front end of the body.

3. A self dumping motor truck comprising, in combination with a wheeled chassis and a power shaft arranged longitudinally of the chassis and operatively connected to the driving wheels of the chassis, of a trough-like body arranged longitudinally of and supported on said chassis and provided with a fixed front wall and a movable rear end gate, a load discharge member slidable through the body toward and from said end gate, fluid controlled means actuated by said power shaft to force said discharge member toward said end gate, and separate means, also operatively connected to and actuated by said power shaft, to return said discharge member to the front end of said body.

4. A self dumping motor truck comprising, in combination with a wheeled chassis, of a trough-like body arranged longitudinally above and supported on said chassis and provided with a fixed front wall and a movable rear end gate, a load discharging member slidable through the trough-like body toward and from said end gate, and means to actuate said discharging member comprising two sets of telescopic cylinder and piston elements, arranged one set on each side of the longitudinal axis of said body, a fixed abutment on the chassis between which and said front body wall the outer fixed cylinder element of each of said sets is held, the inner piston elements of said sets being fixed to said discharging member at the sides of its center, and means attached to said discharging member for positively returning the same to the front end of said body.

5. A self dumping motor truck comprising, in combination with a wheeled chassis, and power shaft arranged longitudinally of the chassis and operatively connected to the driving wheels of the chassis, of a trough-like body arranged longitudinally of and supported on said chassis and provided with a fixed front wall and a movable rear end gate, a series of telescopic cylinder and piston elements arranged in front of said body with the outermost of said elements fixed and bearing against said front end wall, and with the innermost piston elements connected to said slidable discharge member, a pump operatively connected to and driven by said power shaft to force a fluid into said cylinder and piston elements, and discharging-member-returning-means also connected to and actuated by said power shaft.

6. In a motor truck, the combination with a trough-like body to carry a load and provided with a load discharging member movable rearwardly through the body, and means for so forcing said member rearwardly comprising telescopic cylinder and piston elements, with means for delivering a motive fluid under pressure thereto to extend them, certain of the cylinder and piston elements having laterally extending guide arms, and longitudinal guides on the side walls of the body to coöperate with said arms to maintain the cylinder and piston elements in alinement.

7. In a motor truck, the combination with a trough-like body to carry a load and provided with a load discharging member movable rearwardly through the body, and means for so forcing said member rearwardly comprising telescopic cylinder and piston elements, with means for delivering a motive fluid under pressure thereto to extend them, certain of the cylinder and piston elements having laterally extending guide arms, and said body being provided at the upper margins of its side walls with tracks and between said tracks and the bottom of said body with other parallel tracks to coöperate with said guide arms.

In testimony, that I claim the foregoing as my invention I affix my signature in the presence of two witnesses, this 15th day of August, A. D. 1913.

GEORGE W. JACKSON.

Witnesses:
　G. E. DOWLE,
　W. L. HALL.